(12) United States Patent
Wang (10) Patent No.: US 11,206,541 B2
(45) Date of Patent: Dec. 21, 2021

(54) METHOD AND DEVICE FOR MANAGING AND CONTROLLING TERMINAL UE (71) Applicant: China Academy of Telecommunications Technology, Beijing (CN)

(72) Inventor: Hucheng Wang, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 0 days.

(21) Appl. No.: 17/044,327

(22) PCT Filed: Mar. 27, 2019

(86) PCT No.: PCT/CN2019/079840
§ 371 (c)(1),
(2) Date: Oct. 1, 2020

(87) PCT Pub. No.: WO2019/192366
PCT Pub. Date: Oct. 10, 2019

(65) Prior Publication Data
US 2021/0092609 A1    Mar. 25, 2021

(30) Foreign Application Priority Data
Apr. 4, 2018  (CN) .......................... 201810299619.5

(51) Int. Cl.
*H04W 12/12* (2021.01)
*H04L 29/06* (2006.01)
*H04W 88/02* (2009.01)

(52) U.S. Cl.
CPC ......... *H04W 12/12* (2013.01); *H04L 63/1425* (2013.01); *H04L 63/1441* (2013.01); *H04W 88/02* (2013.01)

(58) Field of Classification Search
CPC . H04W 12/12; H04L 63/1425; H04L 63/1441
See application file for complete search history.

(56) References Cited

U.S. PATENT DOCUMENTS

2005/0119008 A1* 6/2005 Haumont ................ H04W 4/70
455/456.1
2006/0229022 A1  10/2006 Bu et al.
(Continued)

FOREIGN PATENT DOCUMENTS

CN      102209073 A    10/2011
CN      103973697 A    8/2014
(Continued)

OTHER PUBLICATIONS

3GPP TS 23.503 V0.4.0, 3rd Generation Partnership Project; Technical Specification Group Services and System Aspects; Policy and Charging Control Framework for the 5G System; Stage 2,(Release 15), total 53 pages, Nov. 2017.
(Continued)

*Primary Examiner* — Ali S Abyaneh
(74) *Attorney, Agent, or Firm* — Kilpatrick Townsend & Stockton, LLP (57) ABSTRACT

Disclosed are a method and device for managing and controlling a terminal UE. The method is applied to a network data analytics function (NWDAF) entity, and the method includes acquiring feature information of a UE; analyzing the feature information, and determining that a security risk exists in the UE; sending a first indication to at least one network function entity in a network, and triggering the at least one network function entity to carry out policy update or parameter adjustment on the UE, and the first indication is used for prompting the type of the security risk confronted by the UE, or for indicating a policy or parameter for the security risk of the UE; and/or sending a
(Continued)

second indication to the UE, and triggering the UE to raise an alarm and/or carry out risk defense.

15 Claims, 6 Drawing Sheets

(56) References Cited

U.S. PATENT DOCUMENTS

| | | | |
|---|---|---|---|
| 2015/0310714 A1* | 10/2015 | Loveland | H04W 12/126 340/539.11 |
| 2016/0173495 A1 | 6/2016 | Joo | |
| 2016/0205128 A1* | 7/2016 | Holtmanns | H04W 12/37 726/1 |
| 2016/0330602 A1* | 11/2016 | Das | H04L 41/12 |
| 2017/0230402 A1 | 8/2017 | Greenspan et al. | |
| 2017/0346824 A1* | 11/2017 | Mahabir | H04W 12/088 |
| 2018/0191848 A1* | 7/2018 | Bhattacharya | H04W 12/63 |
| 2020/0015131 A1* | 1/2020 | Ying | H04W 48/18 |
| 2020/0092802 A1* | 3/2020 | Yang | H04W 48/16 |
| 2020/0196169 A1* | 6/2020 | Dao | H04W 24/08 |
| 2020/0413258 A1* | 12/2020 | Ben Henda | H04W 12/106 |

FOREIGN PATENT DOCUMENTS

| | | |
|---|---|---|
| CN | 105025515 A | 11/2015 |
| CN | 105847237 A | 8/2016 |
| CN | 105992188 A | 10/2016 |
| CN | 106559399 A | 4/2017 |
| CN | 107046549 A | 8/2017 |
| CN | 107104959 A | 8/2017 |
| CN | 107404465 A | 11/2017 |
| CN | 107690149 A | 2/2018 |
| WO | 2015169334 A1 | 11/2015 |

OTHER PUBLICATIONS

China Mobile,"Use Case on mIoT behaviour data collection and analysis". SA WG2 Meeting #126, Feb. 26-Mar. 2, 2018, Montreal, Canada, total 2 pages, S2-182353.

China Mobile,"Solution for performance improvement and supervision of mIoT terminals", SA WG2 Meeting #127, Apr. 16-20, 2018, Sanya, China, total 3 pages, S2-183604.

CATT,"Update and Evaluation of solution 21", SA WG2 Meeting #129bis, Nov. 26-30, 2018, West Palm Beach, USA, total 6 pages, S2-1812241.

* cited by examiner

METHOD AND DEVICE FOR MANAGING AND CONTROLLING TERMINAL UE

The present application is a National Stage of International Application No. PCT/CN2019/079840, filed Mar. 27, 2019, which claims priority of the Chinese Patent Application No. 201810299619.5 filed to the Chinese Patent Office on Apr. 4, 2018, entitled "METHOD AND DEVICE FOR MANAGING AND CONTROLLING TERMINAL UE", the entire contents of which are incorporated herein by reference.

FIELD

The present application relates to the field of communications, and more particularly, relates to a method and device for managing and controlling user equipment.

BACKGROUND

A network data analytics function (NWDAF) entity is introduced in the fifth generation mobile network (5G). The NWDAF entity can analyze network data and provide an analysis result to the 5G network, to perform network optimization.

In the related art, the NWDAF entity can collect and analyze load data of network slices based on static configuration, and provide a network data analysis result related to slices load to network functions such as a policy control function (PCF), so that the network functions such as the PCF can formulate a corresponding network control policy or execute a corresponding network behavior for a terminal belonging to the slices according to the analysis result of the NWDAF. However, since the NWDAF entity can only carry out slice-level network data analysis, thus the NWDAF cannot sense user equipment which currently uses the slices.

That is to say, the existing 5G cannot sense a malicious behavior for the terminal, much less carry out effective defense on the malicious behavior.

For example, once an internet of things (IoT) equipment with a large user number, e.g., street lamps, shared bicycles, etc., is maliciously used or hijacked, the existing 5G cannot sense the malicious behavior for this type of terminals, resulting in that not only is the security problem present, but also severe emergency loss is caused. For example, in 2016, 890,000 cameras and routers infected by "Mirai" made a distributed denial of service (DDoS) attack to a DYN DNS server, resulting in network outage for 6 hours and economic losses of several billions in the east coast of the Deviced States.

It is thus clear that an existing mobile communication network system lacks effective detection and defense on a confronted or potential risk of the terminal.

SUMMARY

Embodiments of the present application provide a method and device for managing and controlling UE in order to solve the problem of an existing mobile communication network system lacking effective detection and defense on a confronted or potential risk of a terminal, to reinforce management and control of the mobile communication network system on the terminal and reduce a system risk.

In one aspect, an embodiment of the present application provides a method for managing and controlling UE, which is applied to an NWDAF entity. The method includes: acquiring UE behavioral information; determining a risk for the UE by analyzing the UE behavioral information; sending a first indication to at least one network function entity in a network, and triggering the at least one network function entity to perform policy update or parameter adjustment for the UE, where the first indication is configured to indicate a type of the risk that the UE has, or the first indication indicates a policy or parameter for solving the risk that the UE has; and/or sending a second indication to the UE to trigger the UE to raise an alarm and/or execute risk defense action, where the second indication indicates a type of the risk that the UE has.

In one embodiment, the policy or parameter for solving the risk that the UE has includes: a mobility management parameter and/or a session management parameter of the UE.

In one embodiment, the UE behavioral information includes one or more of a UE type, a UE location, UE mobility information, application information and a destination address of the UE.

In one embodiment, the determining the risk for the UE by analyzing the UE behavioral information includes: when the UE type indicates that the UE is an IoT equipment and the UE is moved out of a preset fixed area, determining that a stolen risk exists in the UE; or when the UE type indicates that the UE is the IoT equipment and the UE enters a prohibited area, determining that an illegally used risk exists in the UE; or when the UE type indicates that the UE is the IoT equipment and the UE is abnormal in traffic use, determining that a hacker hijacked risk exists in the UE; or when the UE type indicates that the UE is the IoT equipment and the UE accesses an illegal target address, determining that the hacker hijacked risk exists in the UE.

In one embodiment, the sending the first indication to at least one network function entity in the network includes: sending the first indication to a PCF, to make the PCF update an access and mobility management policy, and/or a protocol data device (PDU) session management policy.

In one embodiment, the method further includes: in response to that the PCF determines that a service request of the UE needs to be refused according to the first indication, triggering the PCF to configure all tracking areas (TAs) as prohibited areas of the UE in the access and mobility management policy; or in response to that the PCF determines that speed limitation needs to be performed for a PDU session specified by the UE according to the first indication, triggering the PCF to adjust an aggregation maximum bit rate (AMBR) of the session in the session management policy; or, in response to that the PCF determines that position monitoring or tracking needs to be performed for the UE according to the first indication, triggering the PCF to generate a location monitoring request; or in response to that the PCF determines that the PDU session of the UE needs to be deleted according to the first indication, triggering the PCF to initiate a PDU session termination process.

In one embodiment, the sending the first indication to at least one network function entity in the network includes: sending the first indication to an access and mobility management function (AMF), and triggering the AMF to execute one or a combination of the following operations: deregistering the UE; executing authentication for the UE again; executing location monitoring or tracking for the UE; and restricting the UE to acquire a network service.

In one embodiment, the sending the first indication to at least one network function entity in the network includes: sending the first indication to a session management function (SMF), and triggering the SMF to execute one or a combination of the following operations: restricting data rate for a particular PDU session of the UE; and deleting the PDU session of the UE.

In one embodiment, the mobility management parameter includes a mobility limitation parameter or a periodic update timer value; and the session management parameter includes a quality of service (QoS) parameter.

In one embodiment, after the step of determining the risk for the UE, the method further includes: sending alarm information for indicating the risk for the UE to an application server.

In another aspect, an embodiment of the present application further provides a processing method for existence of a risk in UE, which is applied to UE. The method includes: receiving a first indication sent by a network when the network determines a risk for the UE, where the first indication is configured to indicate a type of the risk that the UE has, or the first indication indicates a policy or parameter for solving the risk that the UE has; and raising an alarm and/or executing risk defense action for the risk according to the first indication.

In one embodiment, the first indication is directly sent after an NWDAF entity analyzes UE behavioral information and determines the risk for the UE, or is sent after a PCF or an AMF or an SMF receives a risk analysis result of the NWDAF entity for the UE.

In one embodiment, the step of triggering the UE to raise an alarm and/or executing risk defense action for the risk according to the first indication includes: sending warning information to an application layer of the UE according to the first indication, and triggering the application layer to send alarm information to an application server; and raising an optical/acoustic/electrical alarm, and/or locking the UE, and/or executing periodic location reporting.

In yet another aspect, an embodiment of the present application further provides a device for managing and controlling UE, which is applied to an NWDAF entity. The device includes: an acquisition device configured to acquire UE behavioral information; a determination device, configured to determine a risk for the UE by analyzing the UE behavioral information; and a processing device configured to send a first indication to at least one network function entity in a network, and trigger the at least one network function entity to perform policy update or parameter adjustment for the UE, where the first indication is configured to indicate a type of the risk that the UE has, or the first indication indicates a policy or parameter for solving the risk that the UE has; and/or configured to send a second indication to the UE to trigger the UE to raise an alarm and/or execute risk defense action, where the second indication is configured to indicate a type of the risk that the UE has.

In one embodiment, when the first indication indicates the policy or parameter for the risk of the UE, the processing device is further configured to: determine that the policy or parameter for solving the risk that the UE has includes a mobility management parameter and/or a session management parameter of the UE.

In one embodiment, the UE behavioral information includes one or more of a UE type, a UE location, UE mobility information, application information and a destination address of the UE.

In the embodiment of the present application, the determination device is configured for: when the UE type indicates that the UE is an IoT equipment and the UE location indicates that the UE is moved out of a preset fixed area, determining that a stolen risk exists in the UE; or when the UE type indicates that the UE is the IoT equipment and the UE enters a prohibited area, determining that an illegally used risk exists in the UE; or when the UE type indicates that the UE is the IoT equipment and the UE is abnormal in traffic use, determining that a hacker hijacked risk exists in the UE; or when the UE type indicates that the UE is the IoT equipment and the UE accesses an illegal target address, determining that the hacker hijacked risk exists in the UE.

In one embodiment, the processing device is further configured for: sending the first indication to a PCF, to make the PCF update an access and mobility management policy, and/or a PDU session management policy.

In one embodiment, the processing device is further configured for: if the PCF determines that a service request of the UE needs to be refused according to the first indication, triggering the PCF to configure all TAs as prohibited areas of the UE in the access and mobility management policy; or if the PCF determines that speed limitation needs to be performed for a PDU session specified by the UE according to the first indication, triggering the PCF to adjust an AMBR of the session in the session management policy; or, if the PCF determines that position monitoring or tracking needs to be performed for the UE according to the first indication, triggering the PCF to generate a location monitoring request; or if the PCF determines that the PDU session of the UE needs to be deleted according to the first indication, triggering the PCF to initiate a PDU session termination process.

In one embodiment, the processing device is further configured for: sending the first indication to an AMF, and triggering the AMF to execute one or a combination of the following operations: deregistering the UE; executing authentication for the UE again; executing location monitoring or tracking for the UE; and restricting the UE to acquire a network service.

In one embodiment, the processing device is further configured for: sending the first indication to an SMF, and triggering the SMF to execute one or a combination of the following operations: restricting data rate for a particular PDU session of the UE; and deleting the PDU session of the UE.

In the embodiment of the present application, the mobility management parameter includes a mobility limitation parameter or a periodic update timer value; and the session management parameter includes a QoS parameter.

In one embodiment, after determining the risk for the UE, the device further includes: a sending device, which is configured for sending alarm information for indicating the risk for the UE to an application server.

In still a further aspect, an embodiment of the present application further provides a processing device for existence of a risk in a terminal UE, which is applied to UE. The device includes: a receiving device, configured to receive a first indication sent by a network when the network determines a risk for the UE, and the first indication is configured to indicate a type of the risk that the UE has, or the first indication indicates a policy or parameter for solving the risk that the UE has; and a triggering device, configured to trigger the UE to raise an alarm and/or execute risk defense action for the risk in response to the first indication.

In one embodiment, the receiving device is configured to receive the first indication directly sent after an NWDAF entity analyzes UE behavioral information and determines the risk for the UE, or is configured to receive the first indication sent after a PCF or an AMF or an SMF receives a risk analysis result of an NWDAF entity for the UE.

In one embodiment, the triggering device is configured for: sending warning information to an application layer of the UE according to the first indication, and triggering the application layer to send alarm information to an application server; and raising an optical/acoustic/electrical alarm, and/or locking the UE, and/or executing periodic location reporting.

In one additional aspect, an embodiment of the present application provides a computer device, including a memory, a processor and a computer program which is stored in the memory and operated on the processor. When the processor executes the computer program, the above method for managing and controlling the UE is implemented.

In one more aspect, an embodiment of the present application provides a computer readable storage medium, storing a computer program. When the computer program is executed by a processor, the above method for managing and controlling the terminal UE is implemented.

Embodiments of the present application describe the NWDAF entity acquires UE behavioral information, analyzes the UE behavioral information and determines a risk for the UE; the NWDAF entity sends a first indication to at least one network function entity in the network to trigger the at least one network function entity to perform policy update or parameter adjustment for the UE, where the first indication is configured to indicate the type of the risk that the UE has, or the first indication indicates the policy or parameter for solving the risk that the UE has; and/or the NWDAF entity sends a second indication to the UE, to trigger the UE to raise the alarm and/or execute risk defense action, where the second indication is configured to indicate the type of the risk that the UE has. That is to say, the UE behavioral information is analyzed by the NWDAF entity to determine the risk of the UE and perform defensive management, reinforcing management and control of the mobile communication network system on the UE and reducing the system risk.

BRIEF DESCRIPTION OF THE DRAWINGS

Embodiments of the present application are described in the accompanying drawings used in the description of the embodiments will be briefly described below.

DETAILED DESCRIPTION OF THE EMBODIMENTS

Embodiment of the present application can be applied to various communication systems, e.g., a global system of mobile communication (GSM), a code division multiple access (CDMA) system, a wideband code division multiple access (WCDMA) system, a general packet radio service (GPRS), a long term evolution (LTE) system, an advanced long term evolution (LTE-A) system, a universal mobile telecommunication system (UMTS), a new radio (NR) and the like.

It also should be understood that in the embodiments of the present application, UE includes, but is not limited to, a mobile station (MS), a mobile terminal, a mobile telephone, a handset and portable equipment and the like, the UE can communicate with one or more core networks by a radio access network (RAN), for example, the UE may be a mobile telephone (or referred to as a cellular phone), a computer with a wireless communication function and the like, and the UE may also be a portable, pocket, handheld, computer built-in or vehicle-mounted mobile device.

In the embodiments of the present application, a base station (e.g., an access point) may refer to equipment in an access network, which communicates with a wireless terminal by one or more fan areas on an air interface. The base station can be used for carrying out interconversion on a received air frame and an internet protocol (IP) packet, and used as a router between a wireless terminal and other portions of the access network, where other portions of the access network may include an IP network. The base station can coordinate attribute management on the air interface. For example, the base station may be a base transceiver station (BTS) in the GSM or CDMA, or may be a NodeB in time division-synchronization code division multiple access (TD-SCDMA) or WCDMA, and may also be an evolutional node B (eNodeB or eNB or e-NodeB) in the LTE, or a gNB in 5G NR, which is not limited herein.

The embodiments of the present application provide a method and device for managing and controlling UE in order to solve the problem of an existing mobile communication network system lacking effective detection and defense on a confronted or potential risk of UE, to reinforce management and control of the mobile communication network system on the UE, and reduce a system risk.

Embodiment of the present application provide a method for managing and controlling UE, which is applied to an NWDAF entity. The method includes: UE behavioral information is acquired; the UE behavioral information is analyzed to determine a risk for the UE; a first indication is sent to at least one network function entity in a network, and the at least one network function entity is triggered to perform policy update or parameter adjustment for the UE, where the first indication is configured to indicate a type of the risk that the UE has, or to indicate a policy or parameter for solving the risk that the UE has; and/or a second indication is sent to the UE, and the UE is triggered to raise an alarm and/or execute risk defense action, where the second indication is configured to indicate the type of the risk that the UE has.

Embodiments of the present application, the NWDAF entity acquires UE behavioral information, analyzes the UE behavioral information and determines a risk for the UE; the NWDAF entity sends a first indication to at least one network function entity in the network, to trigger the at least one network function entity to perform policy update or parameter adjustment for the UE, where the first indication is configured to indicate the type of the risk that the UE has, or to indicate the policy or parameter for the risk that the UE has; and/or the NWDAF entity sends a second indication to the UE, to trigger the UE to raise an alarm and/or execute risk defense action, where the second indication is configured to indicate the type of the risk that the UE has. That is to say, the UE behavioral information is analyzed by the NWDAF entity to determine the risk of the UE and perform defensive management, reinforcing management and control of the mobile communication network system on the UE and reducing the system risk.

The term "and/or" used herein is merely used for describing an association relationship of associated objects and denote that there may be three relationships, for example, A and/or B may denote three cases in which A separately exists, A and B simultaneously exist, and B separately exists. In addition, the character "/" used herein, unless otherwise specified, generally denotes that the previous and subsequent associated objects have an "or" relationship.

In the specification, the claims and the drawings of the present application, terms such as "first" and "second" are used for distinguishing different objects, but are not used for describing a specific order. In addition, a term "include" or "comprise" and any modifications thereof are intended to cover non-exclusive inclusion. For example, processes, methods, systems, products or equipment include a series of steps or devices which are not limited to steps or devices which have been listed, but In one embodiment further include steps or devices which are not listed, or In one embodiment further include other inherent steps or devices for these processes, methods, products or equipment.

"Embodiment" in this specification means that specific features, structures or characteristics described in combination with the embodiment can be included in at least one embodiment of the present application. The phrase "embodiment" appearing at each position in the specification does not necessarily refer to the same embodiment or an independent or alternative embodiment exclusive of other embodiments.

Embodiments described herein can be used for a mobile network system, e.g., 5G.

Figure 1:
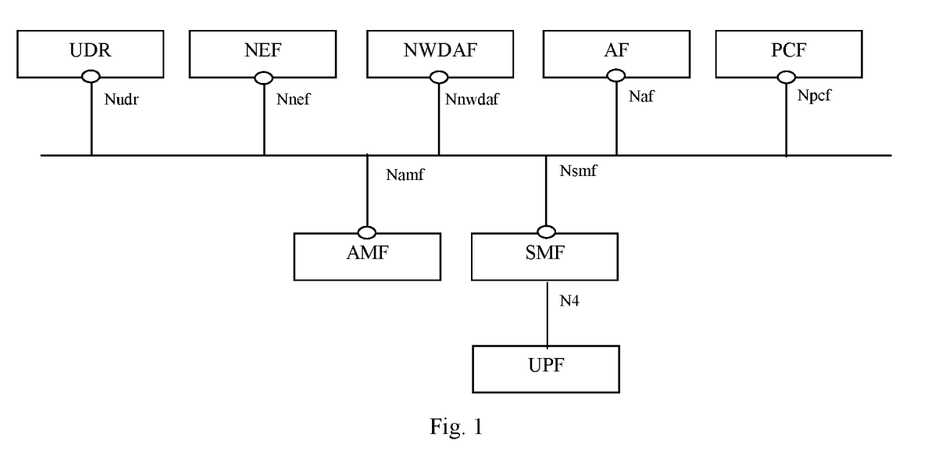
FIG. 1 is a structural schematic diagram of a network function architecture in an embodiment of the present application.

FIG. 1 shows a network function architecture applied in the embodiments used herein. The architecture includes a network layer and a user plane layer. The network layer may include network functions such as an NWDAF, a unified data management (UDM) function, a network exposure function (NEF), an application function (AF), a policy control function (PCF). The UDM includes a user data repository (UDR). The UDR is a user subscription data storage server, can provide user subscription data including a subscription identifier, a security credit, access/mobile management design user subscription information and session management design user subscription information, and can also provide policy data to the PCF, that is to say, the UDR provides a subscription data storage service. The user plane layer can include a user plane function (UPF), an access and mobility management function (AMF), a session management function (SMF) and the like. A function entity of the user plane layer can be connected with UE by a base station and the like. Function entities in the mobile network are connected with each other by a corresponding network interface.

In practical application, the UPF can be used to interact data between the UE and an external data network; the AMF can be used for taking charge of mobility management, and the AMF is connected with the UE and an access network; and the SMF can be used for taking charge of session management, and the SMF is connected with the UPF. The PCF is used for carrying out policy control, the NEF is used for interaction with a third-party application and network capability exposure, the UDM is used for taking charge of storage and management of user data, the NWDAF is a network analysis function managed by an operator, and provides slice-related network data analysis to the PCF.

One embodiment of the present application provides a method for managing and controlling UE, which is applied to an NWDAF entity. In one embodiment, the method is applied to a mobile network system, e.g., a network system as shown in FIG. 1, the method can be executed by corresponding network functions in the network system, and the steps of the method are described as follows.

Figure 2:
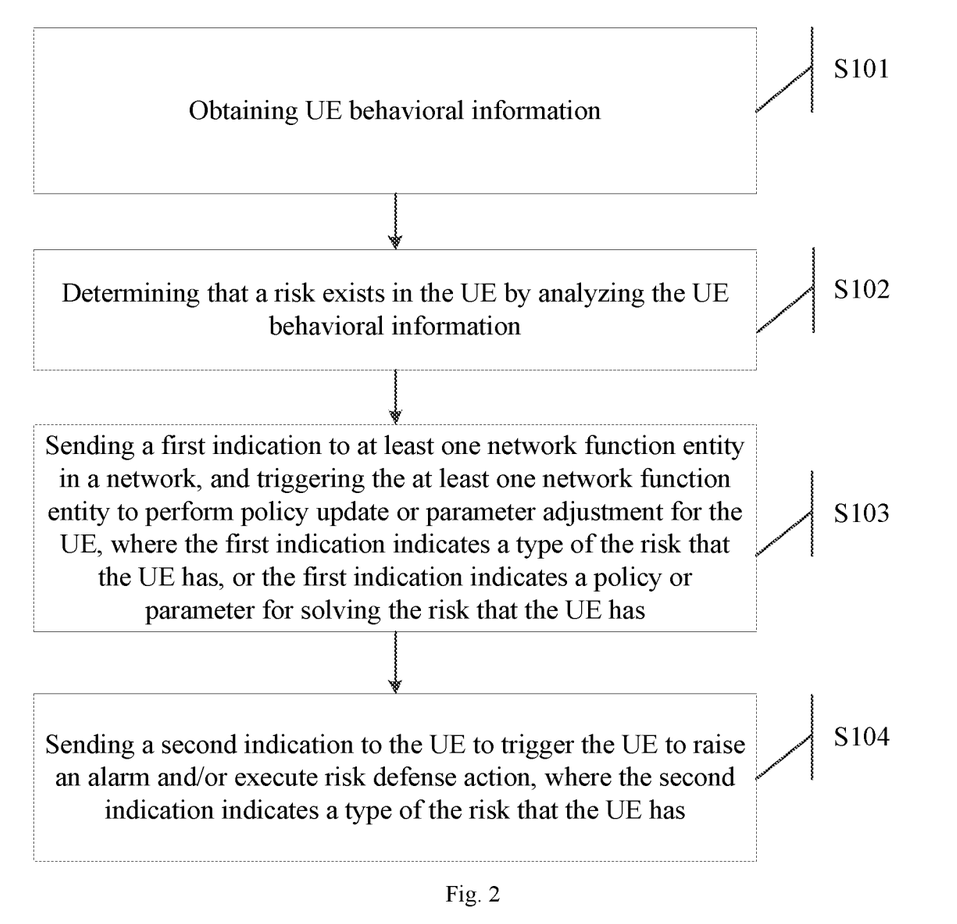
FIG. 2 is a flow chart of a method for managing and controlling UE, as provided by Embodiment I of the present application.

S101: UE behavioral information is acquired.

S102: the UE behavioral information is analyzed to determine a risk for the UE.

S103: a first indication is sent to at least one network function entity in a network, and the at least one network function entity is triggered to perform policy update or parameter adjustment for the UE, where the first indication is configured to indicate a type of the risk that the UE has, or to indicate a policy or parameter for solving the risk that the UE has.

S104: a second indication is sent to the UE, and the UE is triggered to raise an alarm and/or execute risk defense action, where the second indication is configured to indicate the type of the risk that the UE has.

In the specific implementation process, it not only may be a solution of sequentially executing the steps S101, S102 and S103, but also may be a solution of sequentially executing the steps S101, S102 and S104, and further may be a solution of sequentially executing the steps S101, S102, S103 and S104. Embodiments can also design an execution sequence between the step S103 and the step S104 according to the actual use habits of a user, which is not illustrated herein. FIG. 2 shows a flow chart in which the step S103 and the step S104 are simultaneously executed.

In the specific implementation process, firstly, the NWDAF acquires the UE behavioral information, where the UE behavioral information includes one or more of a UE type, a UE location, UE mobility information, application information and a destination address of the UE. Embodiments can also design the UE behavioral information, which is acquired by the NWDAF, of the UE according to actual demands, which is not illustrated herein.

Then, the NWDAF analyzes the UE behavioral information, and determines the risk for the UE. For example, the NWDAF determines that the UE should be located at a fixed position by analyzing the UE type and/or the application information and the like, and thus, after a position change of the UE is detected, it can be determined that the UE is stolen. For example, the UE is terminal equipment mounted on a street lamp, an automatic teller machine (ATM) and monitoring equipment. For further example, the NWDAF determines that the UE stays in a disallowed area (or a prohibited area) for a long time by analyzing the UE location and mobility limitation information of the UE, so that it can be determined that the UE is illegally used, e.g., a shared bicycle enters a residential area. For still further example, the NWDAF determines that the UE is hijacked by a hacker by analyzing the UE type, the application information and the like of the UE when detecting that the UE is abnormal in traffic use, e.g., the data stream of video monitoring equipment is sent to an illegal address.

After the NWDAF determines the risk for the UE, the method further includes the following steps: the first indication is sent to the at least one network function entity in a network to trigger the at least one network function entity to perform policy update or parameter adjustment for the UE.

The first indication is configured to indicate the type of the risk that the UE has, or to indicate the policy or parameter for solving the risk that the UE has.

The at least one network function entity In one embodiment may be one or more of a PCF, an AMF and an SMF.

When the at least one network function entity is the PCF, i.e., the NWDAF sends the first indication to the PCF, the PCF adjusts a network policy for the UE according to the first indication. For further example, firstly, the NWDAF determines modification on various parameters of the UE, e.g., a mobility limitation parameter, a QoS parameter, a periodic update timer value, etc., according to the risk; and then, the NWDAF directly sends these generated parameters to the corresponding network functions, for example, sends the mobility limitation parameter to the AMF and sends the QoS parameter to the SMF.

In the specific implementation process, the following steps may also be executed: the NWDAF directly sends the second indication to the UE, so that the UE is triggered to raise an alarm and/or execute risk defense action.

The second indication is configured to indicate the type of the risk that the UE has. That is to say, if the UE receives the second indication, the UE can determine a corresponding behavior according to the type of the risk, for example, warning information such as information that "a stolen risk currently exists in UE! please timely carry out processing!" is sent by an application layer. Embodiments can design the specific implementation process that the UE raises the alarm and/or carries out risk defense according to the actual use habits of a user, which is not illustrated herein.

In the embodiments of the present application, the NWDAF not only can send the first indication to at least one network function entity in the network to trigger the at least one network function entity to perform policy update or parameter adjustment for the UE, but also can send the second indication to the UE to trigger the UE to raise the alarm and/or execute risk defense action, and the specific implementation processes are correspondingly described in the processes above, and thus will not illustrated herein.

In the embodiments of the present application, the policy or parameter for the risk of the UE includes: a mobility management parameter and/or a session management parameter of the UE.

In the specific implementation process, firstly, the NWDAF determines the mobility management parameter and/or the session management parameter of the UE. The mobility management parameter may be the mobility limitation parameter, and the session management parameter may be the QoS parameter. Then, the NWDAF sends the mobility management parameter and/or the session management parameter to the at least one network function entity, so that the at least one network function entity carries out parameter adjustment for the UE, where the mobility management parameter includes the mobility limitation parameter or the periodic update timer value and the session management parameter includes the QoS parameter. That is to say, the NWDAF can directly send a parameter for modifying the UE to the 5G.

In one embodiment, firstly, the NWDAF determines modification on various parameters of the UE, e.g., the mobility limitation parameter, the QoS parameter, the periodic update timer value, etc., according to the risk. Then, the NWDAF directly sends these generated parameters to the corresponding network functions, for example, the NWDAF sends the mobility limitation parameter to the AMF. Further, the AMF performs parameter adjustment for the UE, for example, configures a shorter periodic timer to track the UE location. For further example, the NWDAF sends the QoS parameter, e.g., the QoS parameter for adjusting a PDU session, to the SMF.

In the embodiments of the present application, the NWDAF can execute risk analysis, and In one embodiment, the NWDAF analyzes the UE behavioral information to judge whether the risk exists in the UE. When determining the risk for the UE, the NWDAF can also further determine a specific type of the risk that the UE may have. Types of the risk include a type that UE is stolen, a type that UE is illegally used, a type that UE is hijacked by a hacker, and the like.

In the specific implementation process, the UE behavioral information includes one or more of a UE type, a UE location, UE mobility information, application information and a destination address of the UE.

For example, the NWDAF analyzes the UE type and the UE location, and determines that the UE is IoT equipment. In one embodiment, the UE type may be a common intelligent terminal, or may be a handheld terminal, or may be an IoT terminal, and the like. The application information can indicate an application type of a certain specific application on the terminal, such as a monitoring type, a lighting type and a finance type. The application information can also indicate a data traffic use case of the application, which is not illustrated herein.

In the embodiments of the present application, the step S102 that the UE behavioral information is analyzed, and existence of a risk in the UE is determined may have, but be not limited to, the following four cases.

The first case is that: when the UE type indicates that the UE is IoT equipment and the UE location indicates that the UE is moved out of a preset fixed area, it is determined that a stolen risk exists in the UE.

In one embodiment, when the UE type indicates that the UE is the IoT equipment and the NWDAF detects that the UE location is not within the preset fixed area, it is determined that the stolen risk exists in the UE. The preset fixed area can be determined by the NWDAF according to allowable area information acquired from the 5G and configured to the UE or geographical range information acquired from an application server and allowed for movement of the terminal. For example, it is determined by the NWDAF that the UE is the IoT equipment and is terminal equipment mounted on a street lamp, generally, this type of terminal needs to be mounted in a certain preset fixed area, and once it is detected that the terminal is moved out of the preset fixed area, it is determined that the stolen risk exists in the UE.

The second case is that: when the UE type indicates that the UE is IoT equipment and the UE is positioned in a prohibited area, it is determined that an illegally used risk exists in the UE.

In one embodiment, when the UE type indicates that the UE is the IoT equipment and the NWDAF detects that the UE is positioned in the prohibited area, it is determined that the illegally used risk exists in the UE. The prohibited area can be determined by the NWDAF according to prohibited area information acquired from the 5G and configured for the UE or geographical range information acquired from the application server and used for prohibiting entry of the terminal. For example, it is determined by the NWDAF that the UE is the IoT equipment and is a transportation means with an allowed area and a prohibited area, e.g., a shared bicycle and a shared car, and once the UE enters the prohibited area such as a residential area and a school, it is determined that the illegally used risk exists in the UE.

The third case is that: when the UE type indicates that the UE is IoT equipment and the UE is abnormal in traffic use, it is determined that a hacker hijacked risk exists in the UE.

For example, when the NWDAF detects that service flow of a certain application on the UE has large differences from that learned by the NWDAF in the aspects of a traffic model, a QoS demand and the like of the application, it is determined that the hacker hijacked risk exists in the UE. For further example, it is determined by the NWDAF that the UE is the IoT equipment and is an application terminal with a fingerprint detection function, and once it is determined that the UE is abnormal in traffic use, e.g., detection is periodically sent, it is determined that the hacker hijacked risk exists in the UE.

The fourth case is that: when the UE type indicates that the UE is IoT equipment and the UE accesses an illegal target address, it is determined that the hacker hijacked risk exists in the UE.

For example, the NWDAF determines features, which In one embodiment can include target network segment information, target address home information and a geographical position attribute, access time, an access frequency of a target address, and the like, of a legal target address accessed by the UE by data analysis and machine learning, and once the NWDAF detects that the address currently accessed by the UE does not conform to the features of the legal target address, it is determined that the hacker hijacked risk exists in the UE. For further example, it is determined by the NWDAF that the UE is the IoT equipment and is a video monitoring terminal, when it is detected that data flow of the video monitoring terminal is sent to the illegal target address, it is determined that the hacker hijacked risk exists in the UE.

In one embodiment, in addition to the above-mentioned four cases in which the UE behavioral information is analyzed to determine the risk for the UE, other methods can be designed for determining the risk for the UE according to actual demands, which are not illustrated herein.

In the embodiments of the present application, the step that the first indication is sent to at least one network function entity in the network includes: the first indication is sent to the PCF, to make the PCF update an access and mobility management policy, and/or a PDU session management policy. In the specific implementation process, if only the PCF can receive an analysis result of the UE behavioral information for the UE from the NWDAF, the PCF can generate a corresponding network defense policy according to the first indication, and carry out policy update on related network functions (e.g., the AMF and the SMF) of a core network.

Figure 3:
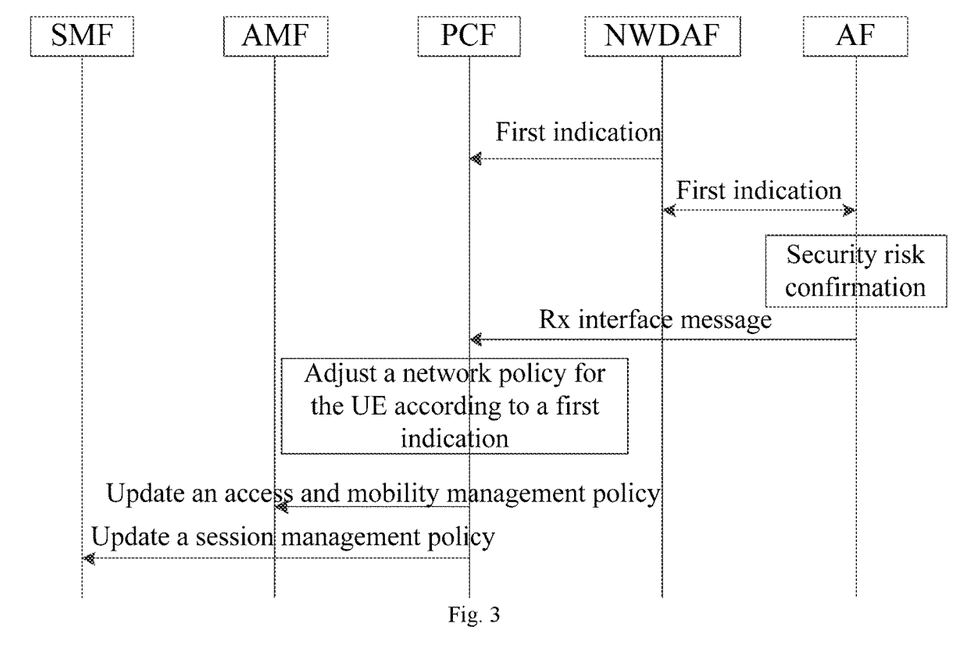
FIG. 3 is a schematic diagram in which a PCF adjusts a network policy for UE according to a first indication in the method for managing and controlling the UE, as provided by Embodiment I of the present application.

As shown in FIG. 3, the PCF adjusts the network policy for the UE according to the first indication. In one embodiment, the PCF can receive the first indication (e.g., a risk prompt or warning indication) from the NWDAF and determine response behaviors of the 5G include: if the risk prompt or warning indication shows that the UE is stolen, position monitoring or tracking is performed for the UE, and a service request of the UE is refused; if the risk prompt or warning indication shows that the UE is illegally used, position monitoring or tracking is performed for the UE, and the UE is limited to be incapable of acquiring a network service; and if the risk prompt or warning indication shows that the UE is hijacked by a hacker, the UE is deregistered, the UE is triggered to carry out re-registration and re-authentication, a new security authentication process is started for the UE, speed limitation is performed for a PDU session of the UE, and/or, the specified PDU session is deleted and the like.

In the specific implementation process, the PCF may also receive a risk prompt or warning indication from an AF through an Rx interface message, which In one embodiment is that the AF further analyzes a terminal behavior and confirms the risk after receiving the risk prompt or warning indication from the NWDAF. In addition, when the AF determines that the risk does not exist in the UE, at the moment, the PCF receives a prompt of no risk from the Rx interface message.

In the specific implementation process, after the PCF receives the first indication, the PCF sends a corresponding instruction or policy update request to the AMF and/or SMF, which includes, but is not limited to, the following four cases.

The first case is that: if the PCF determines that the service request of the UE needs to be refused according to the first indication, the PCF is triggered to configure all tracking areas (TAs) as the prohibited areas of the UE in the access and mobility management policy.

That is to say, if the PCF determines that the service request of the UE needs to be refused according to the first indication, all the TAs are configured as prohibited areas or disallowed areas of the UE in the access and mobility management policy.

The second case is that: if the PCF determines that speed limitation needs to be performed for the PDU session of the UE according to the first indication, the PCF is triggered to adjust an aggregation maximum bit rate (AMBR) of the session in the session management policy.

That is to say, if the PCF determines that speed limitation needs to be performed for the specified PDU session according to the first indication, the AMBR of the session is adjusted in the related policy of the PDU session.

The third case is that: if the PCF determines that position monitoring or tracking needs to be performed for the UE according to the first indication, the PCF is triggered to generate a location monitoring request.

That is to say, if the PCF determines that position monitoring or tracking needs to be performed for the UE according to the first indication, the location monitoring request is generated, so that the UE carries out periodic position reporting.

The fourth case is that: if the PCF determines that the PDU session of the UE needs to be deleted according to the first indication, the PCF is triggered to initiate a PDU session termination process.

In one embodiment speaking, if the PCF determines that the specified PDU session needs to be deleted according to the first indication, the PDU session termination process is initiated.

In one embodiment, after the PCF receives the first indication, the PCF sends a corresponding instruction or policy update request to the AMF and/or the SMF, and in addition to the above-mentioned four cases, also other design instructions or policy update requests sent to the AMF and/or the SMF by the PCF according to the actual use habits of a user, which are not illustrated herein.

In the specific implementation process, if the AMF receives the access and mobility management policy, a corresponding mobility management process is triggered, and a corresponding action is executed, e.g., mobility limitation update is carried out; and for further example, if the AMF receives a request instruction of the PCF, e.g., a location monitoring request, the request instruction of the PCF is executed.

In the specific implementation process, if the SMF receives the related policy of the PDU session, an operation for the PDU session is triggered, and a corresponding action is executed, e.g., the AMBR of the PDU session is adjusted; and if the SMF receives the request instruction of the PCF, the request instruction of the PCF is executed, e.g., the PDU session is deleted.

In addition, in order to further improve management and control efficiency for the UE, after the NWDAF determines the risk for the UE, it is further determined that the first indication is sent to the corresponding network function according to the type of the risk. For example, if the first indication shows that the UE is stolen, the first indication is sent to the AMF and/or the PCF. For further example, if the first indication shows that the UE is illegally used, the first indication is sent to the AMF. For still further example, if the first indication shows that the UE is hijacked by a hacker, the first indication is sent to any one or more of the AMF, the SMF and the PCF.

In the specific implementation process, when the NWDAF directly sends the first indication to the AMF in the 5G, the AMF can directly carry out a risk defense operation, and execute one or a combination of the following operations: the UE is deregistered; security authentication is performed for the UE again; position monitoring or tracking is performed for the UE; and the UE is limited to be incapable of acquiring a network service.

In the specific implementation process, if the AMF subscribes to the first indication for the UE, the AMF determines a corresponding mobility management operation according to the type of the risk, for example, configures a shorter periodic timer to track a position of the terminal.

In the specific implementation process, when the NWDAF directly sends the first indication to the SMF in the 5G; the SMF can directly carry out a risk defense operation, and execute one or a combination of the following operations: speed limitation is performed for the PDU session specified by the UE; and the PDU session specified by the UE is deleted.

In the specific implementation process, if the SMF subscribes to an indication for the specific PDU session, the SMF determines a corresponding session management operation according to the type of the risk, for example, deletes the PDU session.

In the embodiments of the present application, if the NWDAF sends the second indication to the UE, the UE is triggered to raise an alarm and/or execute risk defense action. The second indication is configured to indicate the type of the risk confronted by the UE.

In one embodiment speaking, if the UE receives the second indication, alarm information to indicate the risk for the UE is sent to the application server.

In the specific implementation process, the second indication may be the same as the first indication, or may be different from the first indication, and In one embodiment other designs of the operations according to actual demands, which are not repeated herein.

Figure 4:
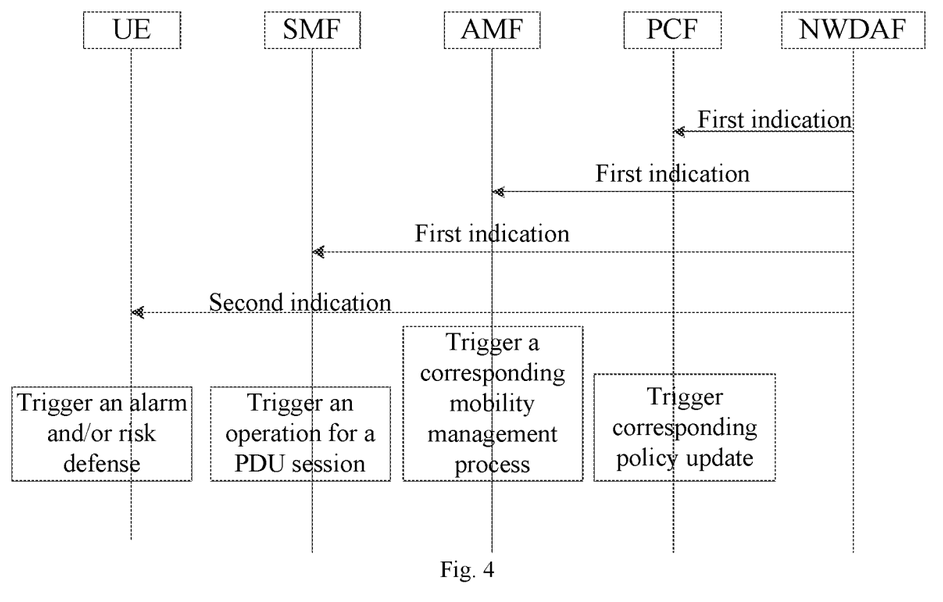
FIG. 4 is a schematic diagram in which an NWDAF directly sends an indication to each network function and/or UE in a network and correspondingly, each network function and/or the UE in the network directly carry/carries out a risk defense operation in the method for managing and controlling the terminal UE, as provided by Embodiment I of the present application.

In the embodiments of the present application, the NWDAF directly sends the indication to each network function in the 5G and/or the UE, correspondingly, each network function in the 5G and/or the UE can directly carry out related risk defense operations, the schematic diagram of the overall processing process is as shown in FIG. 4, and the specific processing process is described in detail above, and thus is not illustrated herein.

Figure 5:
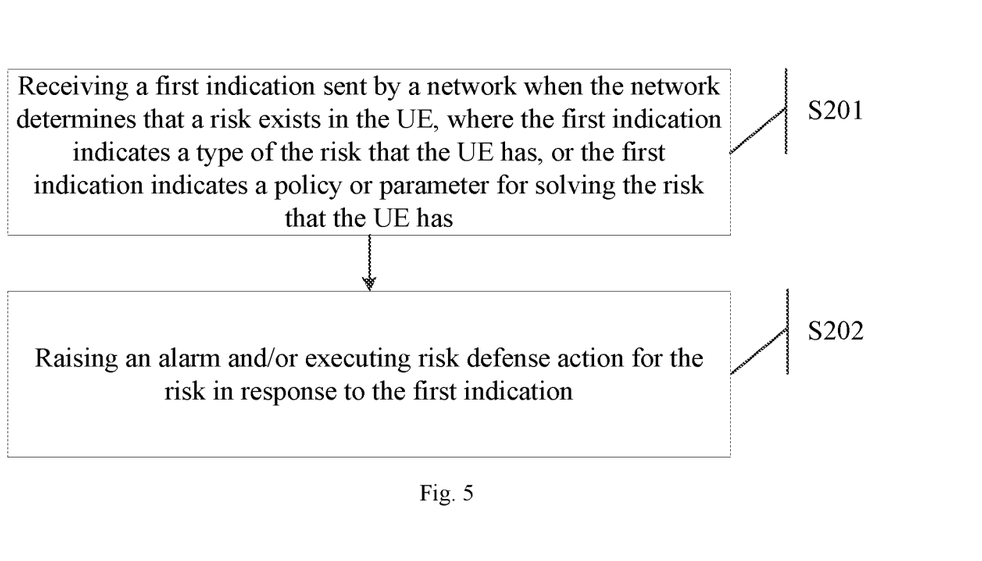
FIG. 5 is a flow chart of a processing method for existence of a risk in UE, as provided by embodiments of the present application.

Based on the same inventive concept as Embodiment I of the present application, with reference to FIG. 5, embodiments of the present application provide a processing method for existence of a risk in UE, which is applied to UE. The method includes the following steps.

S201: a first indication sent by a network when the network determines a risk for a UE is received. The first indication is configured to indicate a type of the risk that the UE has, or to indicate a policy or parameter for solving the risk that the UE has.

S202: the UE is triggered to raise an alarm and/or execute risk defense action for the risk according to the first indication.

In the embodiments of the present application, the specific implementation processes of S201 to S202 are described in detail in Embodiment I, and thus are not repeated herein.

In the embodiments of the present application, the first indication is directly sent after an NWDAF entity analyzes UE behavioral information and determines the risk for the UE, or is sent after a PCF or an AMF or an SMF receives a risk analysis result of the NWDAF entity for the UE.

Figure 6:
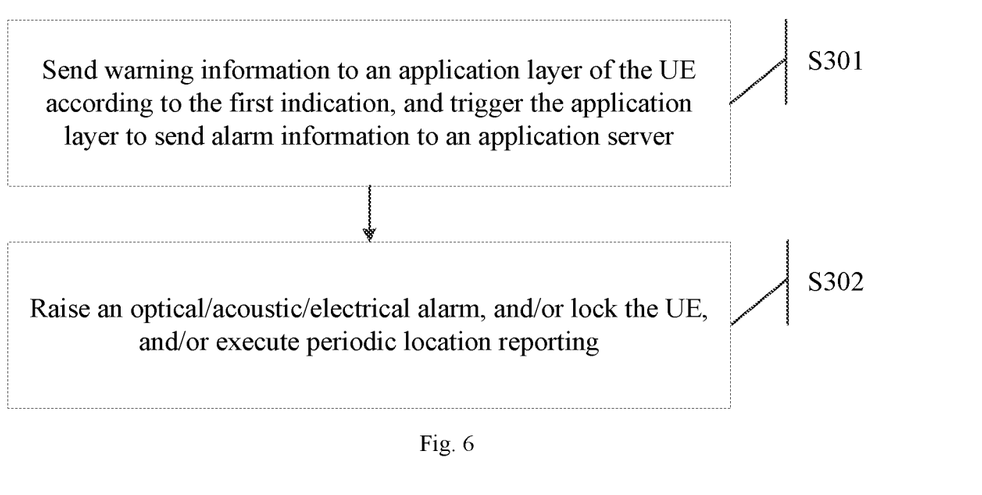
FIG. 6 is a flow chart of S302 in the processing method for existence of the risk in UE, as provided by embodiments of the present application.

In the embodiments of the present application, as shown in FIG. 6, the S202 that the UE is triggered to raise an alarm and/or execute risk defense action for the risk according to the first indication includes S301 and S302.

S301: warning information is sent to an application layer of the UE according to the first indication, and the application layer is triggered to send alarm information to an application server.

S302: an optical/acoustic/electrical alarm is raised, and/or the UE is locked, and/or periodic location reporting is executed.

In the specific implementation process, the specific implementation processes of S301 to S302 are shown as follows.

First, the warning information is sent to the application layer of the UE according to the first indication, and the application layer is triggered to send the alarm information to the application server.

For example, when the first indication indicates that a stolen risk exists in an intelligent equipment numbered "00100", the warning information is sent to an application layer of the intelligent equipment, and the application layer is triggered to send the alarm information that "the stolen risk exists in the intelligent equipment numbered "00100"" to the application server. Then, the alarm is correspondingly raised and/or the risk defense is correspondingly performed. For example, a flashlight of the intelligent equipment numbered "00100" emits light with a certain frequency to warn a user. For further example, the intelligent equipment numbered "00100" vibrates with a certain frequency to warn the user. For still further example, the intelligent equipment numbered "00100" is directly locked, and for example, a shared bicycle is locked and any user cannot use it. In addition, the UE can also be controlled to carry out periodic position reporting, so that a monitor determines a position of the UE in real time, avoiding a case that the UE is stolen to the greatest extent.

In one embodiment, design the process of raising the alarm and/or performing risk defense action for the risk by the UE according to the actual use habits of a user, which is not illustrated herein.

Figure 7:
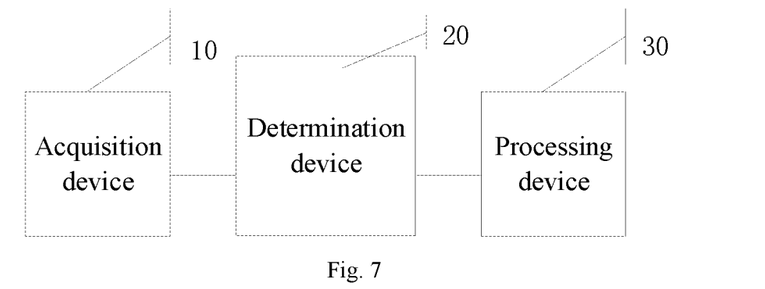
FIG. 7 is a structural schematic diagram of a device for managing and controlling UE, as provided by embodiments of the present application.

Based on the same inventive concept as other embodiments with reference to FIG. 7, an embodiment of the present application further provides a device for managing and controlling UE, which is applied to an NWDAF entity. The device includes an acquisition device 10, a determination device 20 and a processing device 30.

The acquisition device 10 is configured to acquire UE behavioral information.

The determination device 20 is configured to analyze the UE behavioral information and determine a risk for the UE.

The processing device 30 is configured to send a first indication to at least one network function entity in a network and trigger the at least one network function entity to perform policy update or parameter adjustment for the UE, where the first indication is configured to indicate a type of the risk that the UE has, or to indicate a policy or parameter for the risk that the UE has; and/or configured to send a second indication to the UE to trigger the UE to raise an alarm and/or execute risk defense action, where the second indication is configured to indicate the type of the risk that the UE has.

In the embodiments of the present application, when the first indication is configured for indicating the policy or parameter for the risk that the UE has, the processing device 30 is further configured to determine that the policy or parameter for solving the risk that the UE has includes a mobility management parameter and/or a session management parameter of the UE.

In the embodiment of the present application, the UE behavioral information includes one or more of a UE type, a UE location, UE mobility information, application information and a destination address of the UE.

In the embodiment of the present application, the determination device 20 is configured for: when the UE type indicates that the UE is IoT equipment and the UE is moved out of a preset fixed area, determining that a stolen risk exists in the UE; or when the UE type indicates that the UE is IoT equipment and the UE is positioned in a prohibited area, determining that an illegally used risk exists in the UE; or when the UE type indicates that the UE is IoT equipment and the UE is abnormal in traffic use, determining that a hacker hijacked risk exists in the UE; or when the UE type indicates that the UE is IoT equipment and the UE accesses an illegal target address, determining that the hacker hijacked risk exists in the UE.

In the embodiment of the present application, the processing device 30 is configured to send the first indication to a PCF, to make the PCF update an access and mobility management policy, and/or a PDU session management policy.

In the embodiment of the present application, the processing device 30 is further configured to if the PCF determines that a service request of the UE needs to be refused according to the first indication, trigger the PCF to configure all TAs as prohibited areas of the UE in the access and mobility management policy; or if the PCF determines that speed limitation needs to be performed for a PDU session of the UE according to the first indication, trigger the PCF to adjust an AMBR of the session in the session management policy; or, if the PCF determines that position monitoring or tracking needs to be performed for the UE according to the first indication, trigger the PCF to generate a location monitoring request; or if the PCF determines that the PDU session of the UE needs to be deleted according to the first indication, trigger the PCF to initiate a PDU session termination process.

In the embodiment of the present application, the processing device 30 is further configured for: sending the first indication to an AMF, and triggering the AMF to execute one or a combination of the following operations: the UE is deregistered; security authentication is performed for the UE again; position monitoring or tracking is performed for the UE; and the UE is limited to be incapable of acquiring a network service.

In the embodiment of the present application, the processing device 30 is further configured for: sending the first indication to an SMF, and triggering the SMF to execute one or a combination of the following operations: speed limitation is performed for the PDU session specified by the UE; and the PDU session specified by the UE is deleted.

In the embodiment of the present application, the mobility management parameter includes a mobility limitation parameter or a periodic update timer value; and the session management parameter includes a QoS parameter.

In the embodiment of the present application, after determining the risk for the UE, the device further includes: a sending device, which is configured for sending alarm information to indicate the risk for the UE to an application server.

Figure 8:
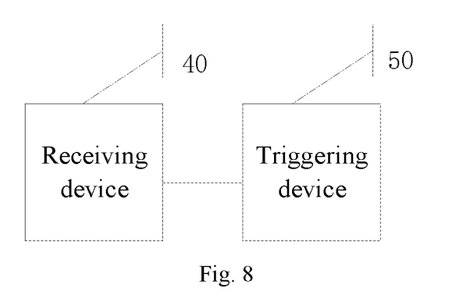
FIG. 8 is a structural schematic diagram of a processing device for existence of a risk in UE, as provided by embodiments of the present application.

Based on the same inventive concept as embodiments with reference to FIG. 8, an embodiment of the present application further provides a processing device for existence of a risk in a terminal UE, which is applied to a UE. The device includes: a receiving device 40 and a triggering device 40.

The receiving device 40 is configured to receive a first indication sent when a network determines a risk for the UE, where the first indication is configured to indicate a type of the risk that the UE has, or to indicate a policy or parameter for solving the risk that the UE has.

The triggering device 50 is configured to trigger the UE to raise an alarm and/or execute risk defense action for the risk according to the first indication.

In the embodiment of the present application, the receiving device 40 is configured for receiving the first indication directly sent after an NWDAF entity analyzes UE behavioral information and determines the risk for the UE, or is used for receiving the first indication sent after a PCF or an AMF or an SMF receives a risk analysis result of the NWDAF entity for the UE.

In the embodiment of the present application, the triggering device 50 is configured for: sending warning information to an application layer of the UE according to the first indication, and triggering the application layer to send alarm information to an application server; and raising an optical/acoustic/electrical alarm, and/or locking the equipment, and/or carrying out periodic position reporting.

Figure 9:
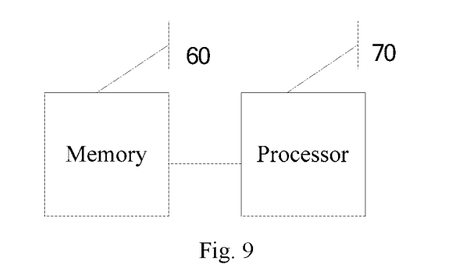
FIG. 9 is a structural schematic diagram of a computer device provided by embodiments of the present application.

An embodiment of the present application provides a computer device. A structure of the computer device is as shown in FIG. 9. In the specific implementation process, the computer device includes a memory 60, a processor 70 and a computer program which is stored in the memory 60 and can be operated on the processor 70, the steps in the method provided by Embodiment I of the present application are implemented when the processor 70 executes the computer program, and the steps in the method provided by embodiments of the present application are implemented when the processor 70 executes the computer program.

In the embodiment of the present application, the processor 70 In one embodiment may be a central processing device or an application specific integrated circuit (ASIC), may be one or more integrated circuits for controlling program execution, may be a hardware circuit developed by using a field programmable gate array (FPGA), and may be a base band processor.

In the embodiment of the present application, the processor 70 may include at least one processing core.

In the embodiment of the present application, electronic equipment further includes a memory 60, and the memory 60 may include a read only memory (ROM), a random access memory (RAM) and a magnetic disk memory. The memory 60 is configured for storing data required when the processor 70 operates. One or more memories 60 are provided.

An embodiment of the present application further provides a computer readable storage medium, storing a computer program; when the computer program is executed by a processor, the steps in the method provided by Embodiment I of the present application are implemented; and when the computer program is executed by the processor, the steps in the method provided by embodiments of the present application are implemented.

In the embodiments of the present application, it should be understood that the disclosed methods and devices can be implemented in other manners. For example, the equipment embodiments described above merely are schematic, for example, partitioning of devices is just logic function partitioning, there may be other partitioning modes in the practical implementation process, and for example, a plurality of devices or components can be combined or can be integrated into another system, or some features can be ignored or are not executed. In addition, the displayed or discussed mutual coupling or direct coupling or communication connection may be indirect coupling or communication connection by some interfaces, equipment or devices, and may be in an electrical mode or other modes.

Function devices in the embodiments of the present application can be integrated in one processing device, or each device can also be an independent physical device.

When an integrated device is implemented in a form of a software function device and is in sale and use as an independent product, the integrated device can be stored in one computer readable storage medium. Based on such understanding, all or part of the embodiments of the present application can be shown in a form of a software product, the computer software product is stored in one storage medium, and includes a plurality of instructions for enabling a computer equipment, for example, which may be a personal computer, a server or a network equipment and the like, or a processor to execute all or part of the steps in the method provided by each embodiment of the present application. The above storage medium includes various media capable of storing program codes, such as a universal serial bus flash drive (USB), a mobile hard disk, an ROM, an RAM, a magnetic disk or a compact disc and the like.

In the embodiments of the present application, the UE behavioral information is acquired by the NWDAF entity; the UE behavioral information is analyzed, and the existence of the risk in the UE is determined; the first indication is sent to the at least one network function entity in the network, and the at least one network function entity is triggered to perform policy update or parameter adjustment for the UE, and the first indication is configured to indicate the type of the risk confronted by the UE, or to indicate the policy or parameter for the risk of the UE; and/or the second indication is sent to the UE, and the UE is triggered to raise the alarm and/or execute risk defense action, where the second indication is configured to indicate the type of the risk that the UE has. That is to say, the UE behavioral information of the terminal is analyzed by the NWDAF entity to determine the risk of the terminal and perform defensive management, reinforcing management and control of the mobile communication network system on the terminal and reducing the system risk.

Embodiments of the present application can be provided as a method, a system or a computer program product. Therefore, the present application can adopt a form of a full hardware embodiment, a full software embodiment or an embodiment combining software and hardware aspects. Moreover, the present application can adopt a form of a computer program product implemented on one or more computer available storage media (including, but not limited to, a magnetic disk memory, a compact disc read-only memory (CD-ROM), an optical memory and the like) with a computer available program code.

The present application is described with reference to the flow charts and/or the block diagrams of the methods, the equipment (system) and the computer program product according to the embodiments of the present application. It should be understood that flows and/or blocks in the flow charts and/or the block diagrams and a combination of the flows and/or the blocks in the flow charts and/or the block diagrams can be implemented by computer program instructions. These computer program instructions can be provided to a processor of a universal computer, a special-purpose computer, an embedded processor or other programmable data processing equipment to generate a machine, so that a device for achieving specified functions in one or more flows in the flow charts and/or one or more blocks in the block diagrams is produced by the instructions executed by the processor of the computer or other programmable data processing equipment.

These computer program instructions can also be stored in a computer readable memory capable of guiding a computer or other programmable data processing equipment to work in a specific manner, so that the instructions stored in the computer readable memory generate a product including an instruction device, and the instruction device achieves the specified functions in one or more flows in the flow charts and/or one or more blocks in the block diagrams.

These computer program instructions can also be loaded onto the computer or other programmable data processing equipment, so that a series of operation steps are executed on the computer or other programmable equipment to generate processing implemented by the computer, and thus, the instructions executed on the computer or other programmable equipment provide steps for achieving the specified functions in one or more flows in the flow charts and/or one or more blocks in the block diagrams.

What is claimed is:

1. A method for managing and controlling user equipment (UE), applied to a network data analytics function (NWDAF) entity, comprising:
   obtaining UE behavioral information;
   determining a risk for the UE by analyzing the UE behavioral information;
   sending a first indication to at least one network function entity in a fifth generation (5G) network, and triggering the at least one network function entity to perform policy update or parameter adjustment for the UE in response to the first indication, wherein the first indication indicates a type of the risk that the UE has, or the first indication indicates a policy or parameter for solving the risk that the UE has; wherein the at least one network function entity is one or more of a policy control function (PCF), an access and mobility management function (AMF) or a session management function (SMF); and sending a second indication to the UE to trigger the UE to raise an alarm and/or execute risk defense action, wherein the second indication indicates a type of the risk that the UE has.

2. The method according to claim 1, wherein the policy or parameter for solving the risk that the UE has comprises: a mobility management parameter and/or a session management parameter of the UE.

3. The method according to claim 2, wherein the mobility management parameter comprises a mobility limitation parameter or a periodic update timer value; and the session management parameter comprises a quality of service (QoS) parameter.

4. The method according to claim 1, wherein the UE behavioral information comprises one or more of a UE type, a UE location, UE mobility information, application information and a destination address of the UE.

5. The method according to claim 4, wherein the determining the risk for the UE by analyzing the UE behavioral information comprises:
determining that a stolen risk exists in the UE in response to that the UE type indicates that the UE is Internet of Things (IoT) equipment and the UE is moved out of a preset fixed area; or
determining that an illegally used risk exists in the UE in response to that the UE type indicates that the UE is IoT equipment and the UE is located in a prohibited area; or
determining that a hacker hijacked risk exists in the UE in response to that the UE type indicates that the UE is IoT equipment and the UE is abnormal in traffic use; or
determining that a hacker hijacked risk exists in the UE in response to that the UE type indicates that the UE is IoT equipment and the UE accesses an illegal target address.

6. The method according to claim 1, wherein the sending the first indication to the at least one network function entity in the network comprises:
sending the first indication to the PCF, to enable the PCF to update an access and mobility management policy, and/or a protocol data device (PDU) session management policy.

7. The method according to claim 6, further comprising:
triggering the PCF to configure all tracking areas (TAs) as prohibited areas of the UE in the access and mobility management policy in response to that the PCF determines that a service request of the UE needs to be refused according to the first indication; or
triggering the PCF to adjust an aggregation maximum bit rate (AMBR) of session in the PDU session management policy in response to that the PCF determines that speed limitation needs to be performed for a PDU session specified by the UE according to the first indication; or,
triggering the PCF to generate a location monitoring request in response to that the PCF determines that position monitoring or tracking needs to be performed for the UE according to the first indication; or triggering the PCF to initiate a PDU session termination process in response to that the PCF determines that a PDU session specified by the UE needs to be deleted according to the first indication.

8. The method according to claim 1, wherein the sending the first indication to the at least one network function entity in the network comprises:
sending the first indication an AMF, and triggering the AMF to execute one or a combination of following operations:
deregistering the UE;
executing authentication for the UE again;
executing location monitoring or tracking for the UE; and
restricting the UE to acquire a network service.

9. The method according to claim 1, wherein the sending the first indication to the at least one network function entity in the network comprises:
sending the first indication to a SMF, and triggering the SMF to execute one or a combination of following operations:
restricting data rate for a particular PDU session of the UE; and
deleting the PDU session of the UE.

10. The method according to claim 1, after the determining the risk for the UE, further comprising:
sending alarm information for indicating the risk for the UE to an application server.

11. A processing method for existence of a risk for user equipment (UE), applied to the UE, comprising:
receiving a first indication sent by a network device when the network device determines the risk for the UE according to an analytics on UE behavioral information, wherein the first indication indicates a type of the risk that the UE has, or the first indication indicates a policy or parameter for solving the risk that the UE has; wherein the network device is a fifth generation (5G) network data analytics function (NWDAF) entity, or a policy control function (PCF), or an access and mobility management function (AMF), or a session management function (SMF);
sending a second indication to the UE to trigger the UE to raise an alarm and/or execute risk defense action, wherein the second indication indicates a type of the risk that the UE has; and
raising an alarm and/or executing risk defense action for the risk in response to the second indication;
wherein the first indication is directly sent by the NWDAF after the NWDAF analyzes the UE behavioral information and determines the risk for the UE according to the UE behavioral information, or the first indication is sent by the PCF, or the AMF, or the SMF after the PCF, or the AMF, or the SMF receives a risk analysis result from an NWDAF entity for the UE.

12. The method according to claim 11, wherein the raising the alarm and/or execute risk defense action for the risk in response to the first indication comprises:
sending warning information to an application layer of the UE in response to the first indication, and triggering the application layer to send alarm information to an application server; and
raising an optical/acoustic/electrical alarm, and/or locking the UE, and/or executing periodic location reporting.

13. A device for managing and controlling user equipment (UE), applied to a network data analytics function (NWDAF) entity, comprising a memory configured to store a computer readable program and a processor configured to execute the computer readable program to:

acquire UE behavioral information;

determine a risk for the UE by analyzing the UE behavioral information; and send a first indication to at least one network function entity in a fifth generation (5G) network, and trigger the at least one network function entity to perform policy update or parameter adjustment for the UE in response to the first indication, wherein the first indication indicates a type of the risk that the UE has, or the first indication indicates a policy or parameter for solving the risk that the UE has; wherein the at least one network function entity is one or more of a policy control function (PCF), an access and mobility management function (AMF) or a session management function (SMF); and send a second indication to the UE to trigger the UE to raise an alarm and/or execute risk defense action, wherein the second indication indicates a type of the risk that the UE has.

14. The device according to claim 13, wherein when the first indication indicates the policy or parameter for the risk that the UE has, the processor is further configured to:

determine that the policy or parameter for solving the risk that the UE has comprises a mobility management parameter and/or a session management parameter of the UE.

15. A processing device for existence of a risk for user equipment (UE), applied to the UE, comprising a memory configured to store a computer readable program and a processor configured to execute the computer readable program to:

receive a first indication sent by a network device when the network device determines the risk for the UE according to an analytics on UE behavioral information, wherein the first indication indicates a type of the risk that the UE has, or the first indication indicates a policy or parameter for solving the risk that the UE has; wherein the network device is a fifth generation (5G) network data analytics function (NWDAF) entity, or a policy control function (PCF), or an access and mobility management function (AMF), or a session management function (SMF);

sending a second indication to the UE to trigger the UE to raise an alarm and/or execute risk defense action, wherein the second indication indicates a type of the risk that the UE has; and trigger the UE to raise an alarm and/or execute risk defense action for the risk in response to the indication;

wherein the processor is further configured to receive the first indication directly sent by the NWDAF after the NWDAF analyzes the UE behavioral information and determines the risk for the UE according to the UE behavioral information, or to receive the first indication sent by the PCF, or the AMF, or the SMF after by the PCF, or the AMF, or the SMF receives a risk analysis result from an NWDAF entity for the UE.

* * * * *